Nov. 29, 1932.  G. KALENOFF  1,889,146

DISH DRAINER

Filed June 10, 1932

INVENTOR
Godel Kalenoff
BY
ATTORNEY

Patented Nov. 29, 1932

1,889,146

UNITED STATES PATENT OFFICE

GODEL KALENOFF, OF BROOKLYN, NEW YORK

DISH DRAINER

Application filed June 10, 1932. Serial No. 616,404.

This invention relates to improvements in kitchen utensils, particularly to a dish-drainer adapted to be placed into a sink or the like, after washing, and it is the principal object of my invention to provide a dish-drainer in which the dishes to be drained are held between the inclined walls of a corrugated material, preferably metal, which have certain angles of inclination and have widened upper apexes, so as to permit of the placing of dishes into the drainer so separated from one another that they cannot touch to prevent chipping or breakage and to ensure a perfect draining.

Another object of my invention is the provision of a dish-drainer of simple and therefore inexpensive construction, yet durable and highly efficient in use.

A further object of my invention is the provision of a dish-drainer equipped with means for engaging and holding small dishes, as for instance butter dishes in the drainer.

A still further object of the invention is the provision of a dish drainer allowing a ready draining of the rinsing water and providing a flat bottom front part for the rinsing and draining of silverware or the like.

These and other objects and advantages of my invention will become more fully known as the description thereof proceeds, and will then be more specifically defined in the appended claims.

In the accompanying drawing forming a material part of this disclosure:

Figure 1:
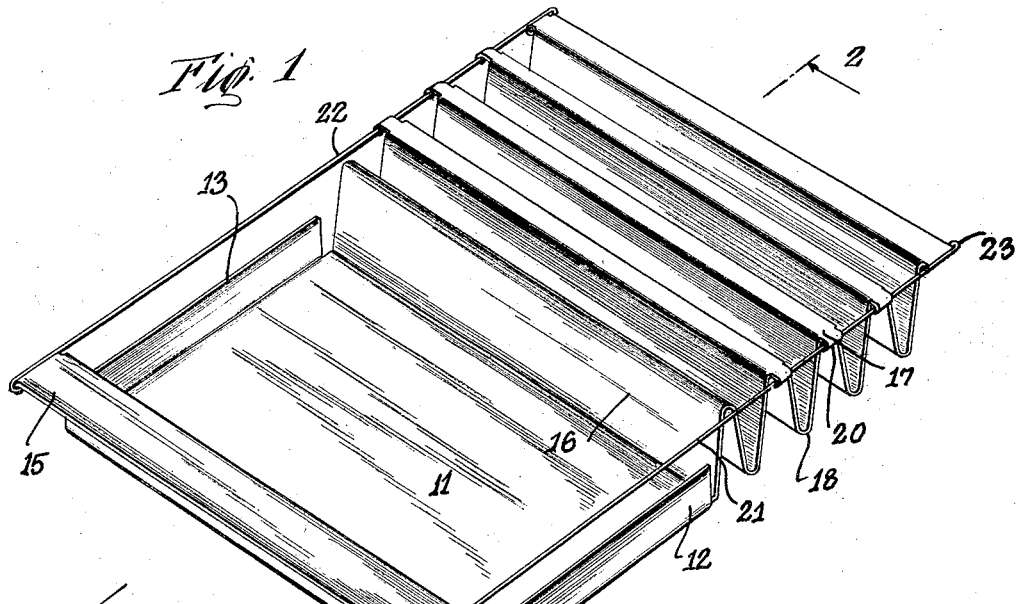
Fig. 1 is a perspective view of a dish-drainer constructed according to my invention.
Figure 2:
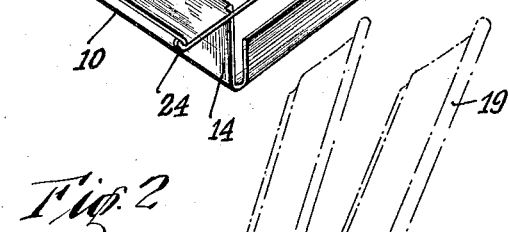
Fig. 2 is a longitudinal section on the line 2—2 of Figure 1.

As illustrated in Figures 1 and 2, the dish-drainer comprises a tray, designated generally, 10, adapted to be placed into a sink or the like, and preferably made from sheet metal, galvanized or made rust-proof in any other suitable manner. The front part or bottom 11 of the tray is flat for the deposition and draining of silverware or the like and has upwardly bent side flanges 12, 13, and a front flange 14 having an outwardly directed margin 15.

The rear part of the tray is formed into a plurality of upwardly directed corrugations 16 angularly disposed to one another so as to present wide upper margins or apexes 17 and lower foot parts 18 by means of which the drainer is supported in the sink. The side parts of the corrugations are open, and the flanges 12, 13 are spaced at their corners from the front flange 14 and the corrugations to allow a ready draining of the rinsing water.

The single members of the corrugated part are arranged at predetermined angles or angular inclinations to one another, so as to allow a placing of the dishes 19 at a certain angle so as to hold the same during drainage separated from one another, to prevent their touching and consequent chipping or breaking.

The outer ends of the margins 17 are rolled to form eyes 20 destined for the passage of connecting or bracing wires 21, 22, the ends of which have hook-form to engage the extreme outer eyes 23, 24 respectively.

Figure 3:
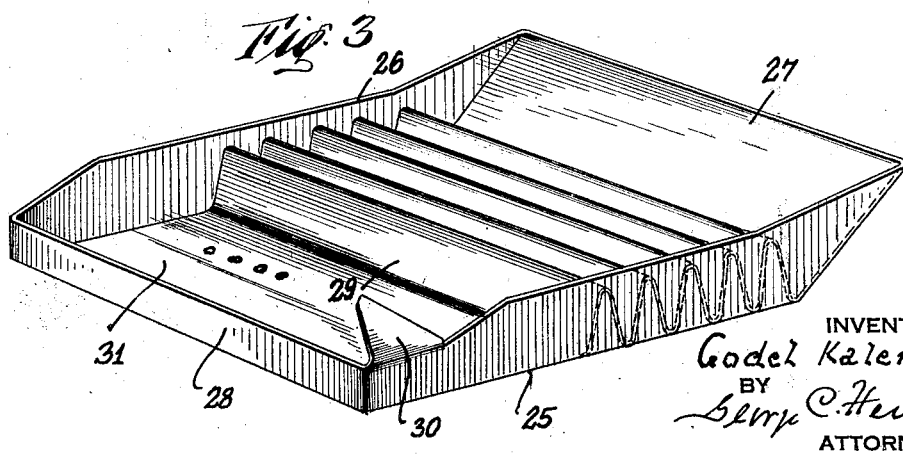
Fig. 3 is a perspective view of a modified form of dish-drainer.

In the form of my invention illustrated in Figure 3, I have shown a tray 25 having upright side walls 26 integrally formed therewith upwardly inclined at their rear ends while their front ends are downwardly inclined. An inclined rear wall 27 connects the side walls at their rear ends and a vertical front wall 28 connects the front ends thereof.

The corrugations 29 are substantially made in the same manner as the corrugations 16 of the form Figures 1 and 2, and their ends are attached to the side walls or pressed in one piece therewith. The rinsing water is removed through openings in the bottom of the tray, and an inclined substantially triangular lip 30 at the inclined front part of one of the side walls ensures a safe support of small dishes, such as for instance butter dishes etc. It will be clear that any required number of such fingers may be arranged suitably altho one only is shown as an example. The front part 31 of the drainer is adapted for the draining of silverware or the like.

In use, the dish-drainer is placed into a sink or the like and the dishes after having been washed are placed between the walls of the corrugated parts as illustrated in Figure 2 and may be rinsed by pouring water over the same, the angular construction of the corrugation walls is such that the dishes at all times are held at such an angle apart from one another that they cannot tip over or touch so that chipping and breaking by careless workers is positively prevented. The rinsing water will freely flow off through the openings in the drainer or its bottom. The finger 30 or fingers will properly hold small dishes at a suitable angle and prevent their tilting.

It will be understood that I have described and shown the preferred form of my device as one example of the many possible ways to practically construct the same and that I may make such changes in the construction of the drainer as come within the scope of the appended claims without departure from the spirit of my invention.

Having thus described my invention what I claim as new and desire to secure by Letters Patent is:

1. A dish-drainer comprising a flat front part and a corrugated rear part, wide apexes on the walls of the corrugations and the inclination of the walls arranged at such angles as to keep dishes placed into the drainer apart to prevent chipping and breakage.

2. A dish drainer comprising a bottom having a flat front part for the support of silverware, the rear part corrugated, the apexes of the corrugations being flattened and wide, and the angular inclination of the corrugation walls being such as to support dishes spaced from one another to prevent touching and chipping or breaking thereby, upstanding flanges on the front part spaced at their edges to allow the flowing off of the rinsing water, and a wire frame for the drainer attached to the corrugations at their ends for supporting a horizontal front flange.

Signed at New York, in the county of New York and State of New York, this 9th day of June, A. D. 1932.

GODEL KALENOFF.